United States Patent
Samata et al.

(10) Patent No.: US 10,840,759 B2
(45) Date of Patent: Nov. 17, 2020

(54) ROTARY ELECTRIC MACHINE

(71) Applicant: MITSUBISHI ELECTRIC CORPORATION, Chiyoda-ku (JP)

(72) Inventors: Kohei Samata, Chiyoda-ku (JP); Takeshi Nakamura, Chiyoda-ku (JP); Ryutaro Kawaguchi, Chiyoda-ku (JP); Norihiko Hana, Chiyoda-ku (JP); Nobuaki Muroki, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/470,302

(22) PCT Filed: Oct. 5, 2017

(86) PCT No.: PCT/JP2017/036303
§ 371 (c)(1),
(2) Date: Jun. 17, 2019

(87) PCT Pub. No.: WO2018/142669
PCT Pub. Date: Aug. 9, 2018

(65) Prior Publication Data
US 2019/0348882 A1     Nov. 14, 2019

(30) Foreign Application Priority Data
Feb. 2, 2017 (JP) .................. 2017-017362

(51) Int. Cl.
*H02K 1/32* (2006.01)
*H02K 1/30* (2006.01)
(Continued)

(52) U.S. Cl.
CPC .................. *H02K 1/32* (2013.01); *H02K 1/30* (2013.01); *H02K 9/06* (2013.01); *H02K 9/08* (2013.01);
(Continued)

(58) Field of Classification Search
CPC .......... H02K 1/30; H02K 1/32; H02K 7/1823; H02K 7/183; H02K 7/1838; H02K 9/06; H02K 9/08
(Continued)

(56) References Cited

U.S. PATENT DOCUMENTS 4,682,064 A * 7/1987 Crounse .................. H02K 9/18
                                                          310/61
4,751,412 A   6/1988 Lowther et al.
(Continued)

FOREIGN PATENT DOCUMENTS

JP   63-228935 A   9/1988
JP   2-70245 A     3/1990
(Continued)

OTHER PUBLICATIONS

International Search Report dated Dec. 26, 2017 in PCT/JP2017/036303 filed on Oct. 5, 2017.

*Primary Examiner* — Tulsidas C Patel
*Assistant Examiner* — Rashad H Johnson
(74) *Attorney, Agent, or Firm* — Xsensus LLP

(57) ABSTRACT

In a rotary electric machine, a rotor including a rotor shaft and a rotor main body provided to the rotor shaft. A baffle plate, which is fixed at a plurality of positions to an end portion of the rotor main body in the axial direction, and is configured to define an airflow passage for cooling gas. Further, the baffle plate is segmented into a plurality of baffle segments which are arrayed in a circumferential direction of the rotor. The baffle segments each include an overlapping portion which overlaps an adjacent baffle segment in an axial direction of the rotor.

7 Claims, 12 Drawing Sheets

(51) Int. Cl.
  *H02K 9/06* (2006.01)
  *H02K 9/08* (2006.01)
  *H02K 7/18* (2006.01)

(52) U.S. Cl.
  CPC ........... *H02K 7/183* (2013.01); *H02K 7/1823* (2013.01); *H02K 7/1838* (2013.01)

(58) Field of Classification Search
  USPC ...................................... 310/55, 89, 216.114
  See application file for complete search history.

(56) References Cited

U.S. PATENT DOCUMENTS

| 2012/0269667 | A1* | 10/2012 | Sakima | F04C 23/02 |
| | | | | 417/423.7 |
| 2013/0049504 | A1* | 2/2013 | Stiesdal | F03D 9/25 |
| | | | | 310/89 |
| 2013/0076169 | A1* | 3/2013 | Pal | H02K 9/19 |
| | | | | 310/59 |
| 2013/0076197 | A1* | 3/2013 | Asaga | H02K 15/03 |
| | | | | 310/216.114 |
| 2015/0056068 | A1* | 2/2015 | Wiebe | F01D 5/06 |
| | | | | 415/173.1 |
| 2016/0258306 | A1* | 9/2016 | Spangler | F01D 25/12 |
| 2017/0204734 | A1* | 7/2017 | Groves, II | F01D 9/065 |
| 2017/0214288 | A1* | 7/2017 | Gray | H02K 9/06 |
| 2017/0257007 | A1* | 9/2017 | Braam | H02K 7/1807 |
| 2018/0175687 | A1* | 6/2018 | Lang | H02K 17/16 |
| 2019/0348882 | A1* | 11/2019 | Samata | H02K 9/06 |

FOREIGN PATENT DOCUMENTS

| JP | 2005-185025 A | 7/2005 |
| JP | 2009-11059 A | 1/2009 |

\* cited by examiner

ROTARY ELECTRIC MACHINE

TECHNICAL FIELD

This invention relates to a rotary electric machine in which a baffle plate configured to define an airflow passage is provided to a rotor.

BACKGROUND ART

In a related-art turbine power generator, during operation, a rotor coil generates heat due to a flow of a field current therethrough, and a stator coil generates heat due to a flow of an output current therethrough. Therefore, an air-sending fan is provided to a rotor shaft so that cooling gas sealed in the power generator is circulated by the air-sending fan.

Moreover, in order to cool the rotor coil through which the field current flows, it is also required that the cooling gas be caused to flow also through a rotor slot in which the rotor coil is provided. Therefore, on an inner periphery of an end ring located at each of end portions of a rotor main body in the axial direction, there are mounted a plurality of baffle plates (for example, see Patent Literature 1).

Meanwhile, it has been known that a radius of a holding ring arranged on an outer periphery of each of the end portions of the rotor main body in the axial direction is increased by a centrifugal force generated during operation of the power generator (see, for example, Patent Literature 2).

CITATION LIST

Patent Literature

[PTL 1] JP 2009-11059 A
[PTL 2] JP H 02-70245 A

SUMMARY OF INVENTION

Technical Problem

In the related-art rotary electric machine described above, the baffle plate is fixed to the end ring. Moreover, the end ring is fixed to the end portion of the holding ring. In this case, when the baffle plate is fixed to the end ring with a plurality of bolts, during the increase in radius of the end ring by the centrifugal force generated during operation of the power generator, the baffle plate having a non-annular shape only move rigidly in a radial direction, and are not deformed similarly to the end ring. Therefore, slip occurs on a contact surface between the baffle plate and the end ring, with the result that relative displacement occurs between bolt hole positions of the baffle plate and bolt hole positions of the end ring. Then, a force may act on the bolts to cause breakage of the bolts.

This invention has been made to solve the problem described above, and has an object to provide a rotary electric machine, even when a radius of a mounting portion for the baffle plate is increased by a centrifugal force, which is capable of preventing relative displacement between fastening hole positions of a baffle plate and fastening hole positions of a rotor main body, and allows the baffle plate to be mounted to the rotor main body with fasteners.

Solution to Problem

According to one embodiment of the present invention, there is provided a rotary electric machine, including: a rotor including a rotor shaft and a rotor main body provided to the rotor shaft; and a baffle plate, which is fixed at a plurality of positions to an end portion of the rotor main body in the axial direction, and is configured to define an airflow passage for cooling gas, wherein the baffle plate is segmented into a plurality of baffle segments which are arrayed in a circumferential direction of the rotor, and wherein the baffle segments each include an overlapping portion which overlaps an adjacent baffle segment in an axial direction of the rotor.

Advantageous Effects of Invention

In the rotary electric machine according to this embodiment, the baffle plate is segmented into a plurality of baffle segments arrayed in a circumferential direction of the rotor, and the baffle segments each have an overlapping portion which overlaps with an adjacent baffle segment in an axial direction of the rotor. Therefore, while cooling gas is blocked with the overlapping portions, intervals of the baffle segments at fixed portions with respect to the rotor main body change, thereby being capable of following the change in radius of the mounting portion for the baffle plate. With this, even when the radius of the mounting portion for the baffle plate is increased by the centrifugal force, the rotary electric machine is capable of preventing relative displacement between fastening hole positions of a baffle plate and fastening hole positions of a rotor main body, and allows the baffle plate to be mounted to the rotor main body with fasteners.

DESCRIPTION OF EMBODIMENTS

Now, embodiments of the present invention are described with reference to the drawings.

First Embodiment

Figure 1:
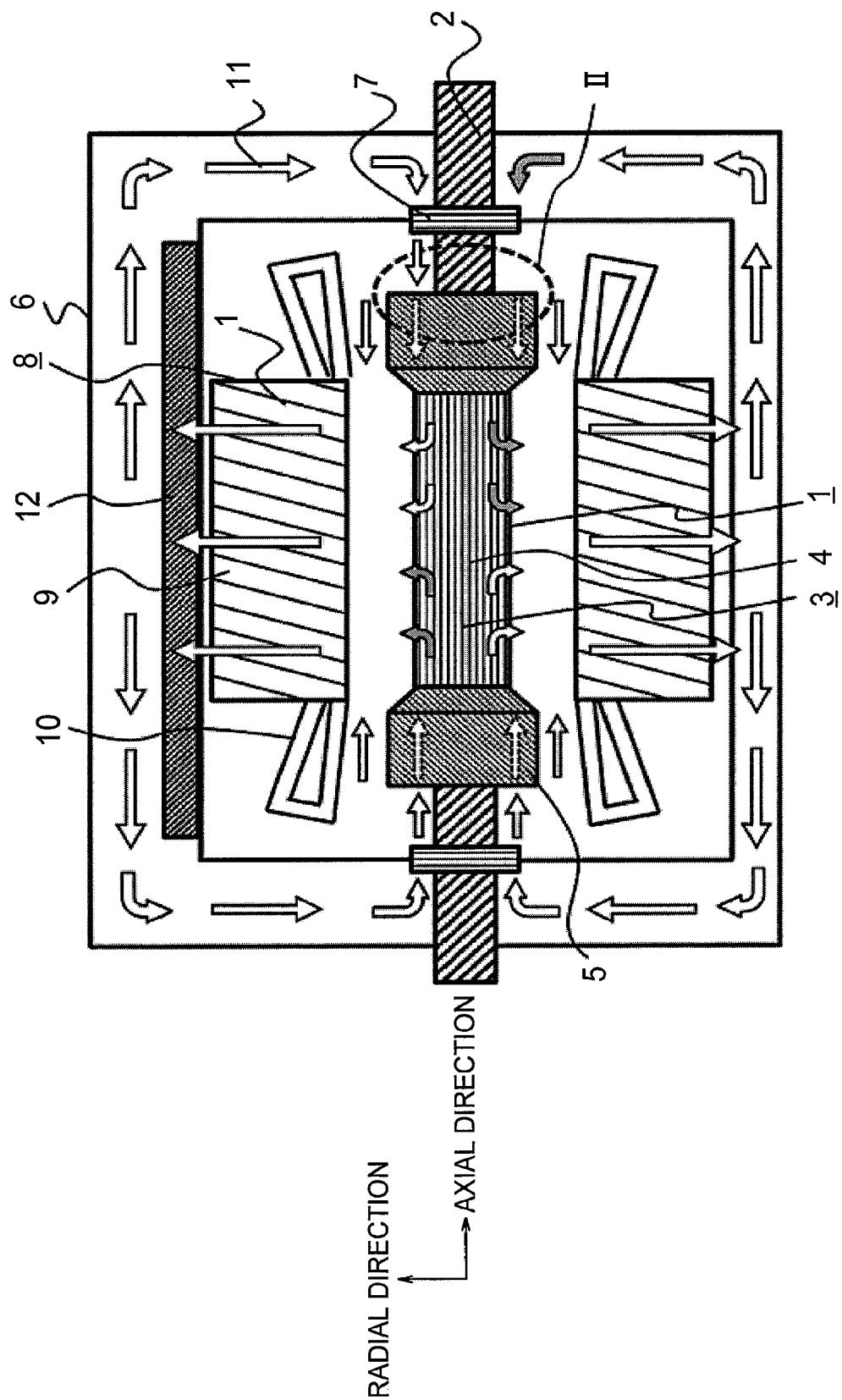
FIG. 1 is a sectional view of a power generator according to a first embodiment of this invention.

FIG. 1 is a sectional view of a power generator according to a first embodiment of this invention. In FIG. 1, a rotor 1 includes a rotor shaft 2 and a rotor main body 3 provided to the rotor shaft 2.

The rotor main body 3 includes a rotor core 4, a plurality of rotor coils (not shown), and a pair of holding rings 5. The rotor core 4 has a plurality of rotor slots (not shown). The rotor coils are provided in the rotor slots. The holding rings 5 surround both end portions of the rotor core 4 in the axial direction to hold the rotor coils.

The rotor shaft 2 is supported on a frame 6 so as to be rotatable. A pair of air-sending fans 7 is provided to the rotor shaft 2. The air-sending fans 7 are opposed to both end portions of the rotor main body 3 in the axial direction and rotate integrally with the rotor shaft 2.

A stator 8 is fixed to an inner periphery of the frame 6. The stator 8 includes a cylindrical stator core 9 and a plurality of stator coils 10 provided to the stator core 9. The stator 8 surrounds the rotor 1. An inner peripheral surface of the stator 8 is opposed to an outer peripheral surface of the rotor 1.

Cooling gas 11 is sealed in the frame 6. For example, hydrogen or air is used as the cooling gas 11. A gas cooling device 12 is provided on a radially outer side of the stator 8 in the frame 6. When the rotor 1 rotates, the air-sending fans 7 rotate, to thereby circulate the cooling gas 11 in the frame 6. With this, relevant portions in the frame 6 are cooled.

In the rotor radial ventilation cooling system as illustrated in FIG. 1, the cooling gas 11 is sent out by the air-sending fans 7 and passes through the rotor main body 3 and the stator 8, to thereby become higher in temperature. After that, the cooling gas 11 passes through the gas cooling device 12, to thereby become lower in temperature. Then, the cooling gas 11 returns to the air-sending fans 7.

Figure 2:
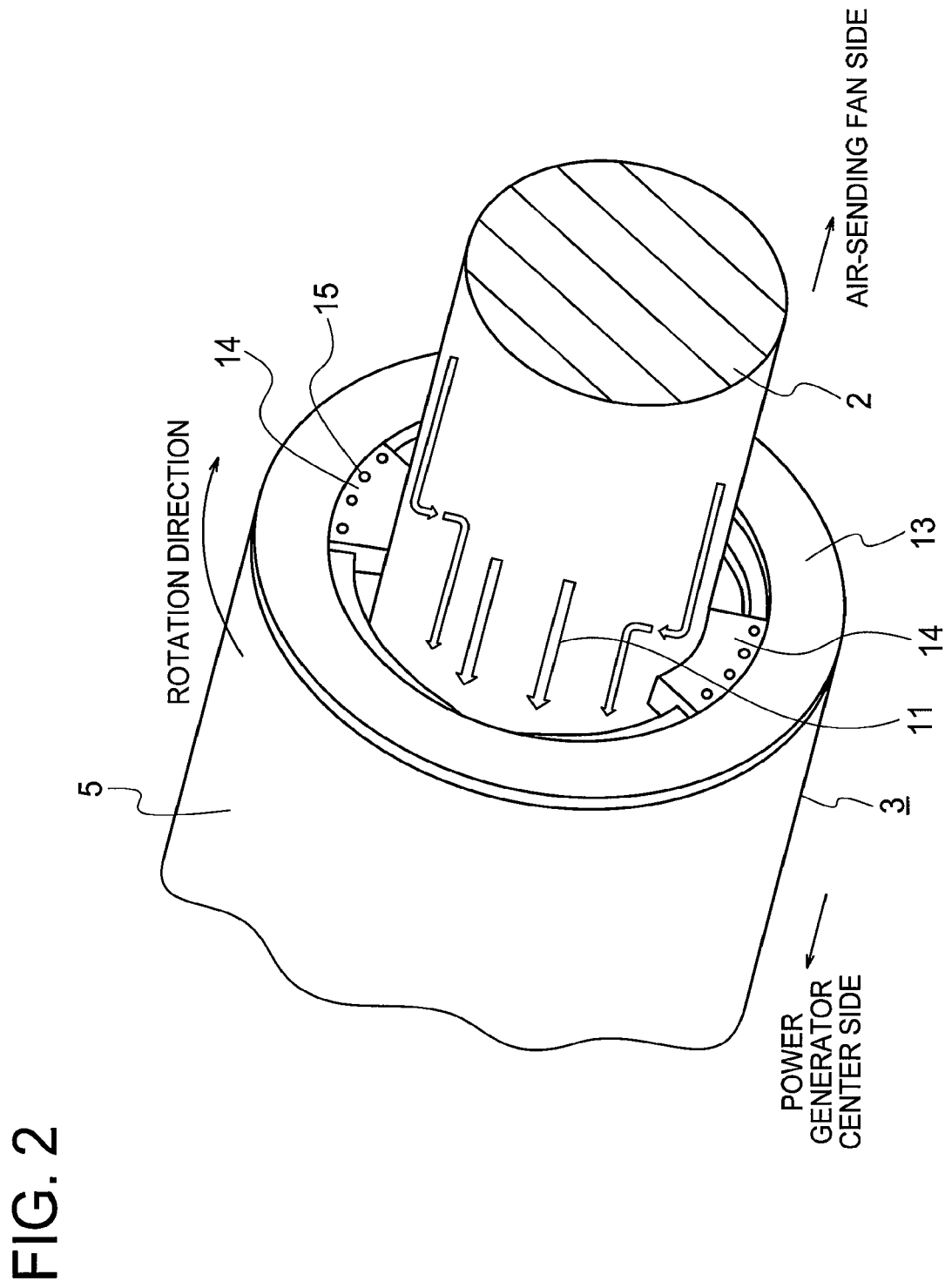
FIG. 2 is an enlarged perspective view for illustrating a portion II of FIG. 1.

FIG. 2 is an enlarged perspective view for illustrating a portion II of FIG. 1. The rotor main body 3 further includes a pair of end rings 13. The end rings 13 are fixed to end portions of corresponding holding rings 5, which are opposed to the air-sending fans 7.

A plurality of baffle plates 14 are fixed to an inner periphery of the end ring 13. That is, the baffle plates 14 are each fixed to end portions of the rotor main body 3, which are opposed to the air-sending fan 7. The baffle plates 14 each are fixed to the end ring 13 by a plurality of bolts 15 being fasteners. That is, the baffle plates 14 are fixed to the end ring 13 at a plurality of positions.

The baffle plates 14 are arranged at intervals in a circumferential direction of the end ring 13. With those baffle plates 14, a flow of the cooling gas 11 in the axial direction is blocked. With this, an airflow passage for the cooling gas 11, which is defined so as to extend from the end portion of the rotor main body 3 into the rotor core 4, is formed.

Figure 3:
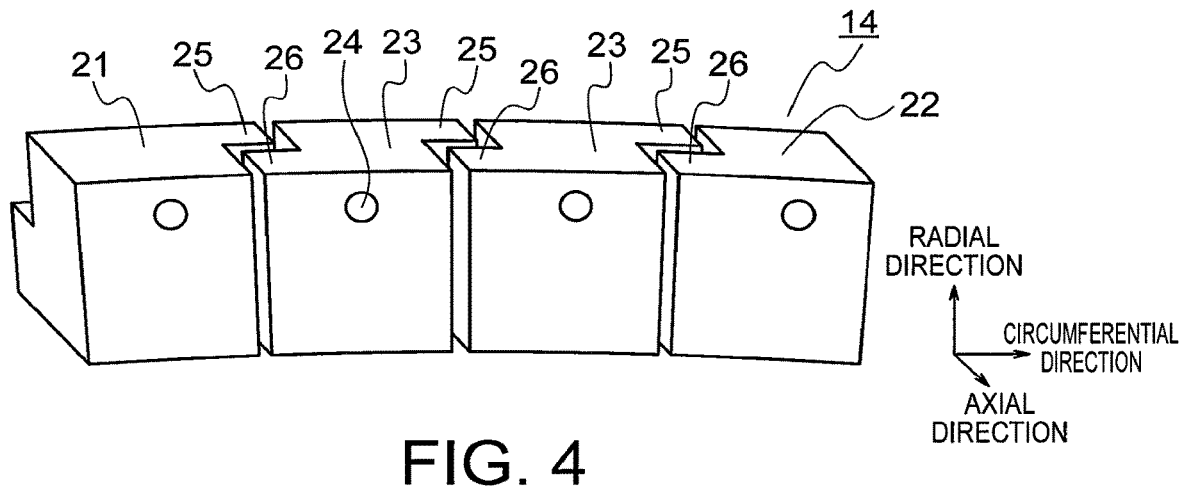
FIG. 3 is a perspective view for illustrating a baffle plate of FIG. 2.
Figure 4:
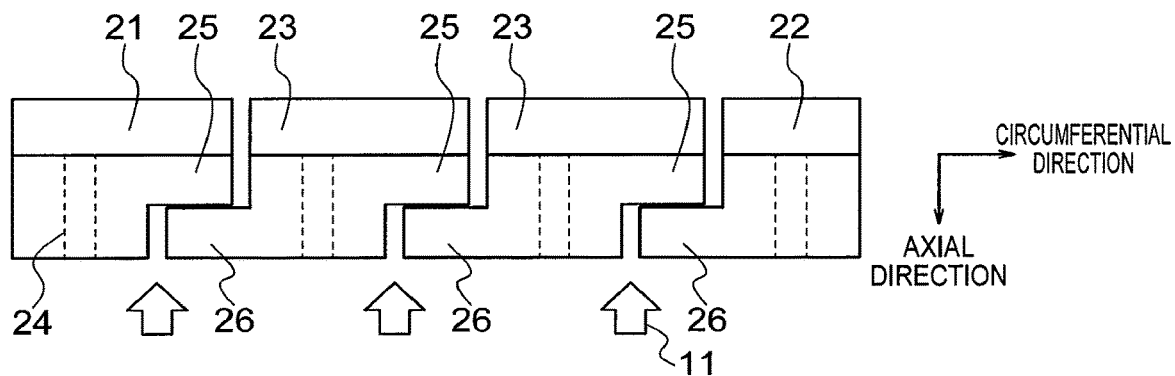
FIG. 4 is a plan view of the baffle plate of FIG. 2 as viewed from a radially outer side of a rotor.

FIG. 3 is a perspective view for illustrating the baffle plate 14 of FIG. 2. FIG. 4 is a plan view of the baffle plate 14 of FIG. 2 as viewed from a radially outer side of the rotor 1. The baffle plate 14 is segmented into a plurality of baffle segments arrayed in a circumferential direction of the rotor 1. In this example, as the baffle segments, there are used a first-end baffle piece 21, a second-end baffle piece 22, and two intermediate baffle pieces 23.

The first-end baffle piece 21 is arranged at a first end of the baffle plate 14 in the circumferential direction of the rotor 1. The second-end baffle piece 22 is arranged at a second end of the baffle plate 14 in the circumferential direction of the rotor 1. The intermediate baffle pieces 23 are arranged between the first-end baffle piece 21 and the second-end baffle piece 22.

The baffle pieces 21, 22, and 23 each have an L-shaped section as viewed along the circumferential direction of the rotor 1. The baffle pieces 21, 22, and 23 each have one through hole being a fastener hole for allowing a bolt 15 to pass therethrough. The baffle pieces 21, 22, and 23 are each fixed to the end ring 13 with only one bolt 15. In other words, the baffle plate 14 is segmented so that the number thereof corresponds to the number of bolts 15.

The first-end baffle piece 21 includes a first overlapping portion 25 which overlaps the adjacent intermediate baffle piece 23 in the axial direction of the rotor 1. The first overlapping portion 25 is formed in such a manner that a part of the surface opposed to the air-sending fan 7 is offset toward a side opposite to the air-sending fan 7, to thereby form a step.

The second-end baffle piece 22 includes a second overlapping portion 26 which overlaps the adjacent intermediate baffle piece 23 in the axial direction of the rotor 1. The second overlapping portion 26 is formed in such a manner that a part of the surface opposed to the air-sending fan 7 is offset toward a side opposite to the air-sending fan 7, to thereby form a step.

The intermediate baffle pieces 23 each include the first overlapping portion 25 which overlaps the second overlapping portion 26 of the adjacent intermediate baffle piece 23 or the second overlapping portion 26 of the adjacent second-end baffle piece 22 in the axial direction of the rotor 1. Moreover, the intermediate baffle pieces 23 each include the second overlapping portion 26 which overlaps the first overlapping portion 25 of the adjacent first-end baffle piece 21 or the first overlapping portion 25 of the adjacent intermediate baffle piece 23 in the axial direction of the rotor 1.

When the baffle plate 14 is to be mounted to the end ring 13, first, the first-end baffle piece 21 is fixed to the end ring 13 which is fixed in advance to the holding ring 5.

Next, the intermediate baffle piece 23 adjacent to the first-end baffle piece 21 is fixed to the end ring 13.

Further, in the similar manner, the remaining intermediate baffle piece 23 and second-end baffle piece 22 are sequentially fixed to the end ring 13.

Figure 5:
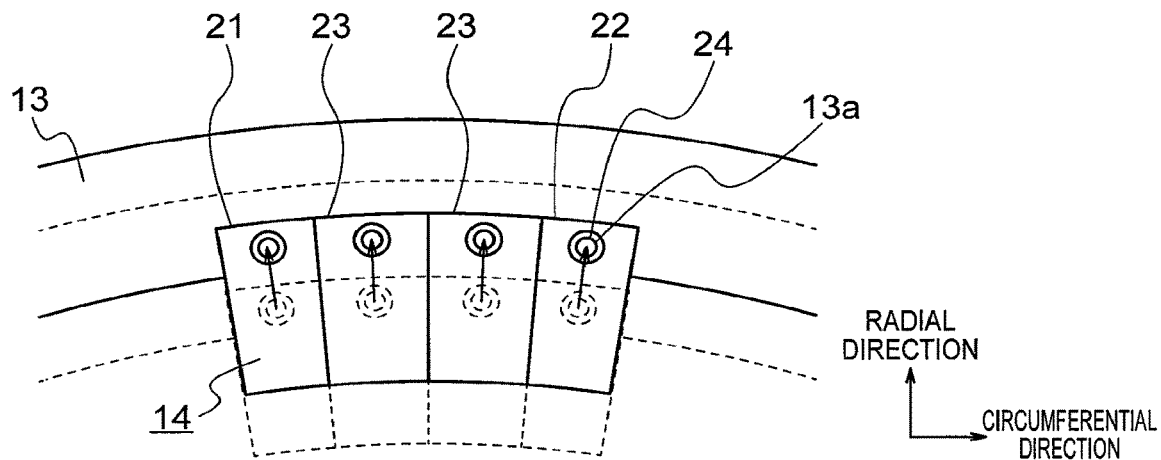
FIG. 5 is an explanatory view for schematically illustrating states of an end ring and the baffle plate of FIG. 2 during stop of the power generator and during operation of the power generator.

FIG. 5 is an explanatory view for schematically illustrating states of the end ring 13 and the baffle plate 14 of FIG. 2 during stop of the power generator and during operation of the power generator. In FIG. 5, the state during stop of the power generator is indicated by the broken lines, and the state during operation of the power generator is indicated by the solid lines.

In the first embodiment, when a radius of the end ring 13 is increased by a centrifugal force generated during operation of the power generator, the baffle pieces 21, 22, and 23 each independently follow the increase in radius. Then, respective intervals of fixed portions of the baffle pieces 21, 22, and 23 with respect to the end ring 13, that is, the respective intervals between the through holes 24 are changed. With this, the baffle pieces 21, 22, and 23 are capable of following the change in radius of the end ring 13 being the mounting portion for the baffle plate 14. Thus, relative displacement between the through holes 24 and the bolt holes 13a being the fastener holes of the end ring 13 do not occur.

Moreover, even when the intervals of the through holes 24 change to some extent, the first overlapping portions 25 and the second overlapping portions 26 overlap with each other, with the result that the cooling gas 11 is blocked, and a function of the baffle plate 14 is maintained.

Thus, even when a radius of the end ring 13 is increased by the centrifugal force, the baffle plate 14 can be mounted to the end ring 13 with the bolts 15 without occurrence of the relative displacement between the positions of the through holes 24 of the baffle plate 14 and the positions of the bolt holes 13a of the end ring 13.

Moreover, through fastening of the bolts 15, the first overlapping portions 25 and the second overlapping portions 26, which overlap each other, of the baffle pieces 21, 22, and 23 are held in surface contact in the axial direction of the rotor 1. Therefore, an airflow passage for allowing passage of the cooling gas 11 is not defined among the baffle pieces 21, 22, and 23.

Second Embodiment

Figure 6:
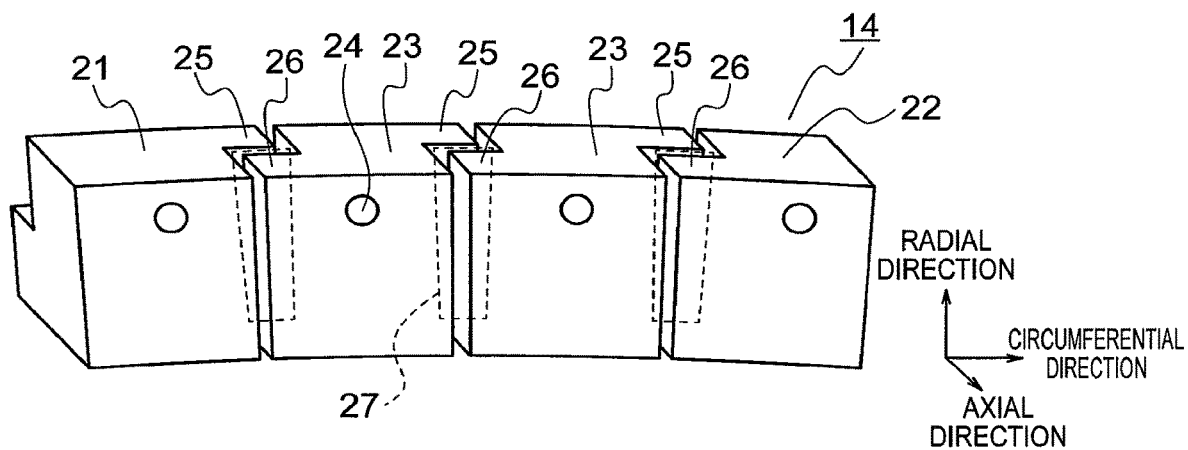
FIG. 6 is a perspective view for illustrating a baffle plate in a second embodiment of this invention.
Figure 7:
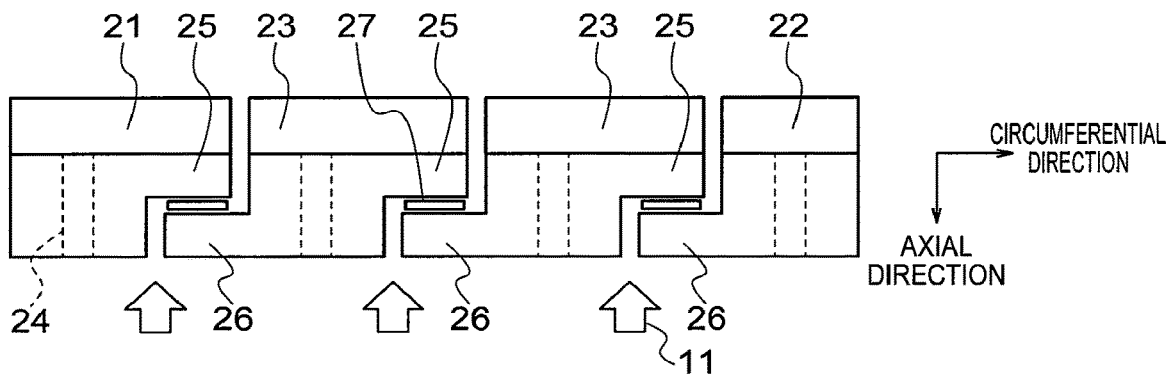
FIG. 7 is a plan view of the baffle plate of FIG. 6 as viewed from a radially outer side of the rotor.

Next, FIG. 6 is a perspective view for illustrating a baffle plate 14 in a second embodiment of this invention, and FIG. 7 is a plan view of the baffle plate 14 of FIG. 6 as viewed from the radially outer side of the rotor 1.

In the second embodiment, resin plates 27 each having a rectangular shape and serving as an interposition plate are interposed between the first overlapping portions 25 and the second overlapping portions 26, which overlap each other. As a material of the resin plate 27, there may be used, for example, fluororesin, polyether ketone resin, polyamide imide resin, or polyamide resin. Other configurations are similar or identical to those of the first embodiment.

When the baffle plate 14 is to be mounted to the end ring 13, first, the first-end baffle piece 21 is fixed to the end ring 13 which is fixed in advance to the holding ring 5.

Next, while the resin plate 27 is interposed between the first overlapping portion 25 and the second overlapping portion 26, the intermediate baffle piece 23 adjacent to the first-end baffle piece 21 is fixed to the end ring 13.

Further, in the similar manner, the remaining intermediate baffle piece 23 and second-end baffle piece 22 are sequentially fixed to the end ring 13.

In the first embodiment, the first overlapping portion 25 and the second overlapping portion 26 are held in direct contact with each other. However, in the second embodiment, the resin plate 27 is interposed between the first overlapping portion 25 and the second overlapping portion 26. Therefore, when the bolts 15 are fastened, under the surface pressure generated in the axial direction of the rotor, the resin plates 27 are deformed in conformity with the shapes of the overlapping surfaces of the baffle pieces 21, 22, and 23, thereby being brought into close contact with the overlapping surfaces.

With this, even when the processing accuracy of the overlapping surfaces of the baffle plates 21, 22, and 23 is poor as compared to the first embodiment, the airflow passage for allowing passage of the cooling gas is not defined among the baffle pieces 21, 22, and 23.

Moreover, through fastening of the bolts 15, the surface pressure in the axial direction of the rotor 1 is generated between the baffle pieces 21, 22, and 23 and the resin plates 27. Therefore, a friction force being a resisting force against the centrifugal force during operation of the power generator acts on the resin plate 27. With this, the relative displacement in the radial direction does not occur between the resin plates 27 and the baffle pieces 21, 22, and 23. Thus, the airflow passage for allowing passage of the cooling gas 11 is not defined among the baffle pieces 21, 22, and 23.

Third Embodiment

Figure 8:
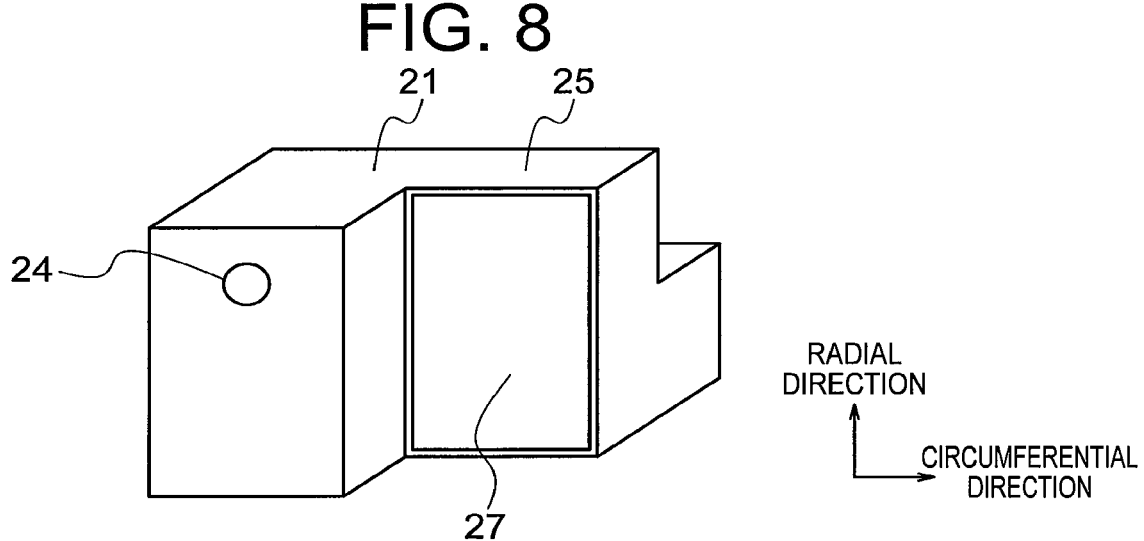
FIG. 8 is a perspective view for illustrating a first-end baffle piece of a baffle plate in a third embodiment of this invention.
Figure 9:
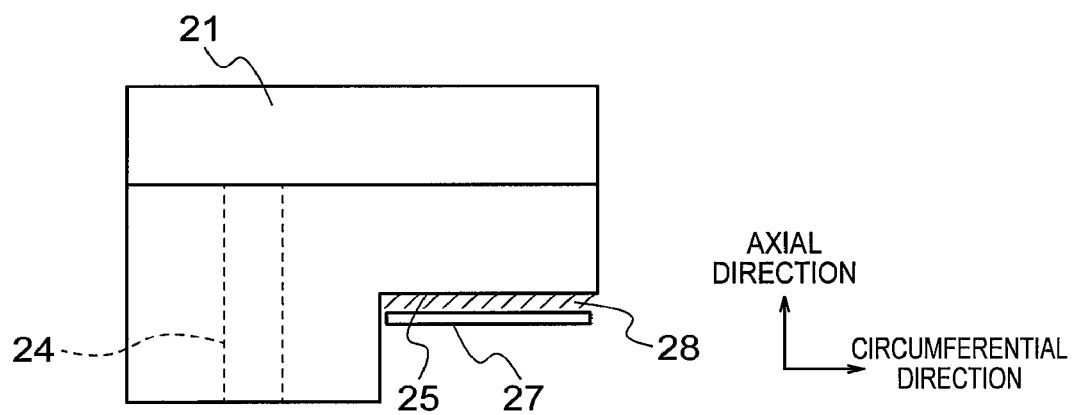
FIG. 9 is a plan view of the first-end baffle piece of FIG. 8 as viewed from the radially outer side of the rotor.

Next, FIG. 8 is a perspective view for illustrating a first-end baffle piece 21 of a baffle plate 14 in a third embodiment of this invention, and FIG. 9 is a plan view of the first-end baffle piece 21 of FIG. 8 as viewed from the radially outer side of the rotor 1. In the third embodiment, the resin plate 27 is bonded to the first overlapping portion 25 of the first-end baffle piece 21 with an adhesive 28. Each of other resin plates 27 is also bonded to any one of the first overlapping portion 25 and the second overlapping portion 26 overlapping each other with the adhesive 28. Other configurations are similar or identical to those of the second embodiment.

In such power generator, the resin plate 27 is bonded in advance to any one of the first overlapping portion 25 and the second overlapping portion 26. Therefore, when the baffle plate 14 is to be mounted to the end ring 13, it is only required to simply fix the baffle pieces 21, 22, and 23 to the end ring 13 with the bolts 15.

Thus, work time required for mounting the baffle plate 14 to the end ring 13 can be shortened. Moreover, not only the friction force but also a bonding force act against the centrifugal force which is generated by the own weight of the resin plates 27 during the operation of the power generator. Therefore, the relative displacement in the radial direction of the rotor 1 is less liable to occur between the resin plates 27 and the baffle pieces 21, 22, and 23.

Fourth Embodiment

Figure 10:
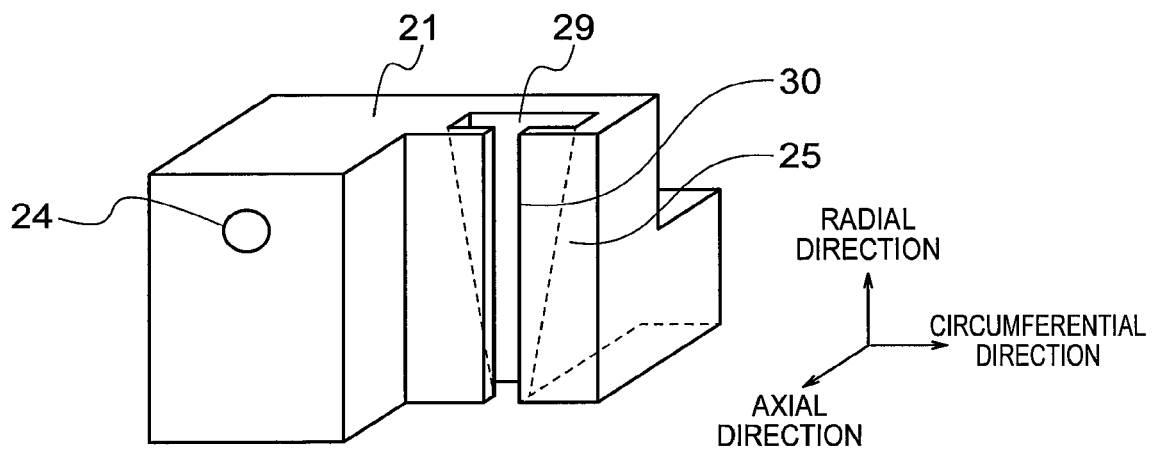
FIG. 10 is a perspective view for illustrating a first-end baffle piece of the baffle plate in a fourth embodiment of this invention.
Figure 11:
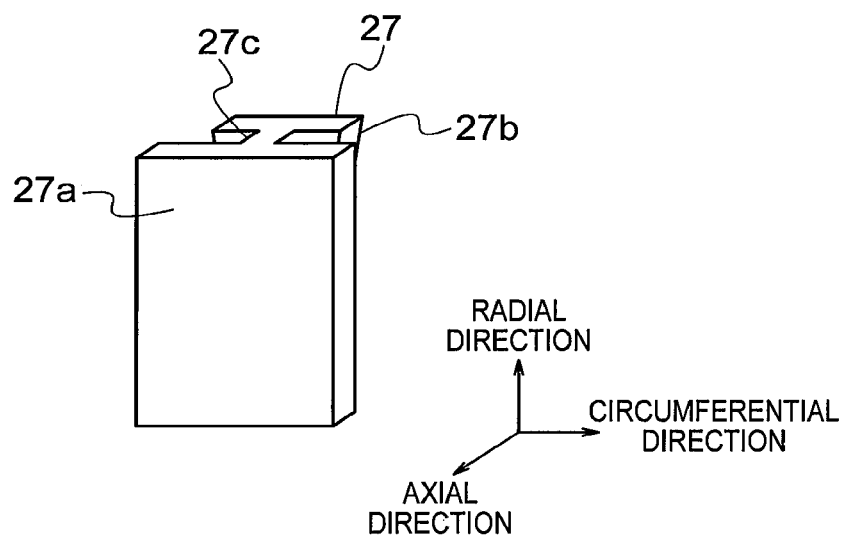
FIG. 11 is a perspective view for illustrating a resin plate to be combined with the first-end baffle piece of FIG. 10.
Figure 12:
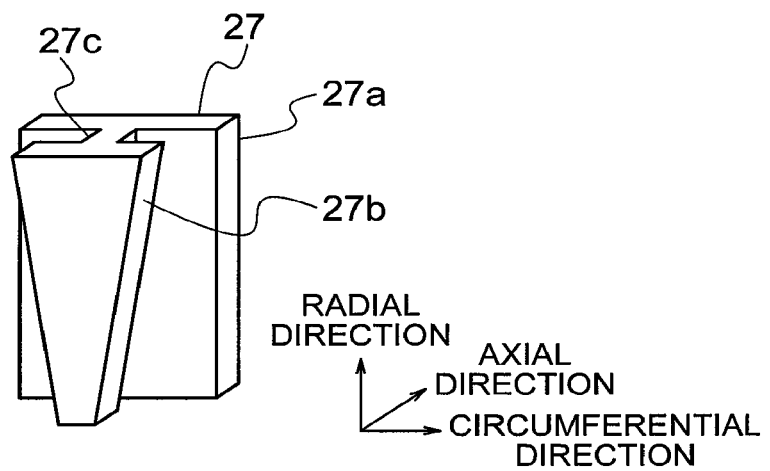
FIG. 12 is a perspective view of the resin plate of FIG. 11 as viewed from a side opposite to that of FIG. 11.

Next, FIG. 10 is a perspective view for illustrating a first-end baffle piece 21 of a baffle plate 14 in a fourth embodiment of this invention, FIG. 11 is a perspective view for illustrating a resin plate 27 to be combined with the first-end baffle piece 21 of FIG. 10, and FIG. 12 is a perspective view of the resin plate 27 of FIG. 11 as viewed from a side opposite to that of FIG. 11.

The resin plate 27 in the fourth embodiment includes a resin plate main body 27a, an insertion portion 27b, and a connection portion 27c. The resin plate main body 27a has a flat-plate shape, and is an interposition plate main body. The insertion portion 27b has a wedge shape. The connection portion 27c connects the resin plate main body 27a and the insertion portion 27b to each other. The resin plate main body 27a, the insertion portion 27b, and the connection portion 27c are integrally formed. A dimension of the insertion portion 27b in the circumferential direction of the rotor 1, that is, a width dimension is gradually reduced toward the radially inner side of the rotor 1.

The first overlapping portion 25 of the first-end baffle piece 21 has an insertion groove 29 and a slit 30. The insertion groove 29 is configured to receive the insertion portion 27b to be inserted thereinto. The slit 30 is configured to allow the connection portion 27c to pass therethrough. A dimension of the insertion groove 29 in the circumferential direction of the rotor 1, that is, a width dimension is gradually reduced toward the radially inner side of the rotor 1 so as to correspond to the wedge shape of the insertion portion 27b.

The resin plate 27 is mounted to the first-end baffle piece 21 through insertion of the insertion portion 27b into the insertion groove 29 along the radial direction of the rotor 1. The insertion portion 27b is fixed to the insertion groove 29 with a fitting tolerance corresponding to that of transition-fit or interference-fit.

Other resin plates 27 and baffle pieces 22 and 23 also have a similar configuration. Moreover, remaining resin plates 27 are also fixed to corresponding baffle piece 22 or 23 by a similar method. Other configurations are similar or identical to those of the second embodiment.

In such power generator, the resin plate 27 is bonded in advance to any one of the first overlapping portion 25 and the second overlapping portion 26. With this, when the baffle plate 14 is to be mounted to the end ring 13, it is only required to simply fix the baffle pieces 21, 22, and 23 to the end ring 13 with the bolts 15.

Thus, time required for the operation of mounting the baffle plate 14 to the end ring 13 can be shortened. Moreover, the insertion portion 27b is fixed to the insertion groove 29 by transition-fit or interference-fit. With this, a compression force in the circumferential direction of the rotor 1 acts on the insertion portion 27b, to thereby increase a maximum static friction force to be generated in the resin plate 27 against the centrifugal force generated during operation of the power generator. Therefore, the relative displacement in the radial direction of the rotor 1 is less liable to occur between the resin plates 27 and the baffle pieces 21, 22, and 23.

Figure 13:
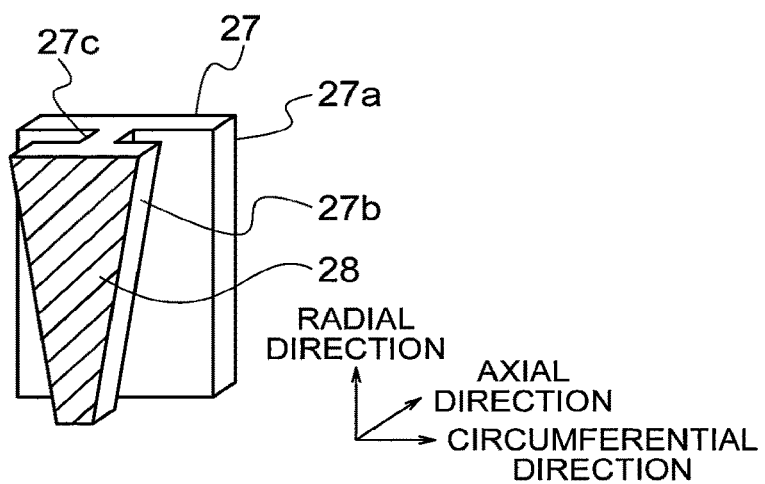
FIG. 13 is a perspective view for illustrating a modification example in which an adhesive is applied to an insertion portion of FIG. 12.

Moreover, as illustrated in FIG. 13, the adhesive 28 may be applied to the insertion portion 27b so that the insertion portion 27b is bonded to the first overlapping portion 25 or the second overlapping portion 26 with the adhesive 28. With this, not only the friction force but also the bonding force acts against the centrifugal force generated by the own weight of the resin plate 27 during operation of the power generator. Therefore, the relative displacement in the radial direction of the rotor 1 is further less liable to occur between the resin plates 27 and the baffle pieces 21, 22, and 23.

Fifth Embodiment

Figure 14:
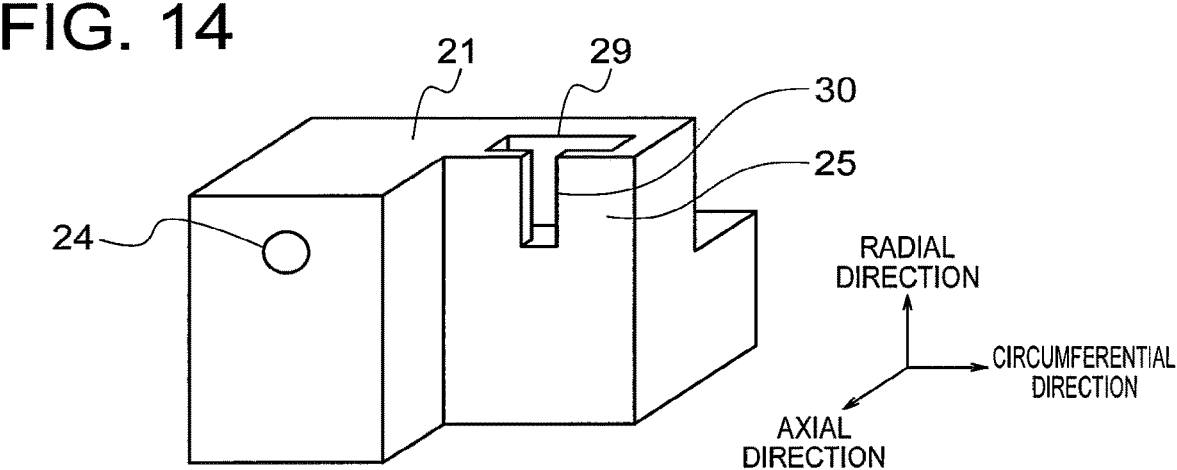
FIG. 14 is a perspective view for illustrating a first-end baffle piece of a baffle plate in a fifth embodiment of this invention.
Figure 15:
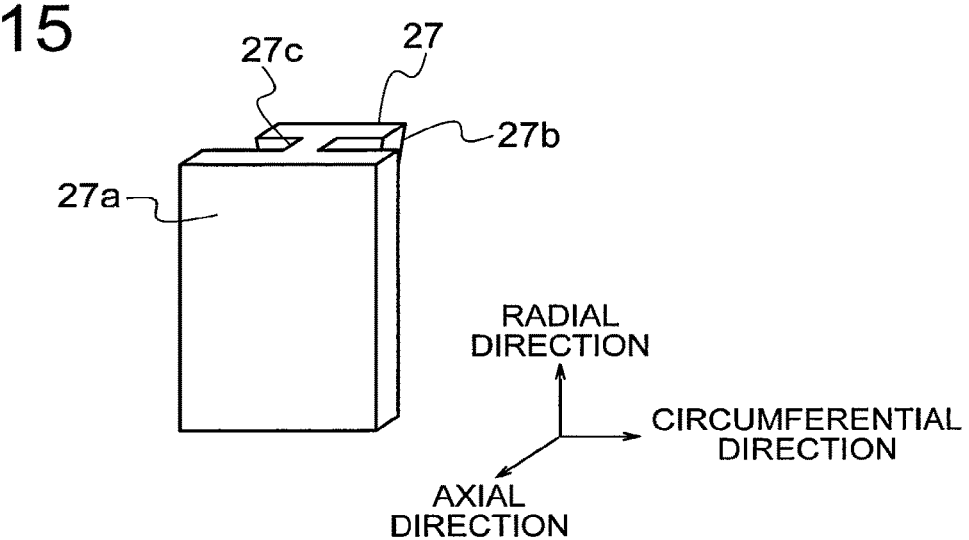
FIG. 15 is a perspective view for illustrating a resin plate to be combined with the first-end baffle piece of FIG. 14.
Figure 16:
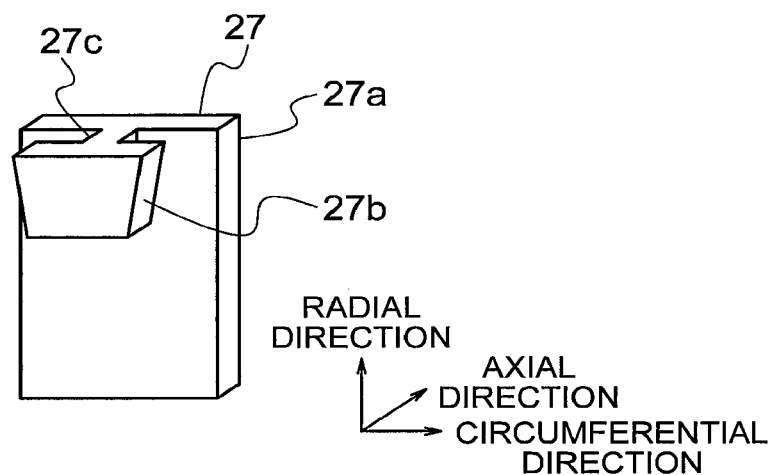
FIG. 16 is a perspective view of the resin plate of FIG. 15 as viewed from a side opposite to that of FIG. 15.

Next, FIG. 14 is a perspective view for illustrating a first-end baffle piece 21 of a baffle plate 14 in a fifth embodiment of this invention, FIG. 15 is a perspective view for illustrating a resin plate 27 to be combined with the first-end baffle piece 21 of FIG. 14, and FIG. 16 is a perspective view of the resin plate 27 of FIG. 15 as viewed from a side opposite to that of FIG. 15.

In the fourth embodiment, the insertion portion 27b is provided so as to extend over an entire length of the resin plate 27 in the radial direction of the rotor 1, and the insertion groove 29 passes through the first-end baffle piece 21 in the radial direction of the rotor 1.

Meanwhile, in the fifth embodiment, the insertion portion 27b is provided to the resin plate main body 27a within a range of from an outer side to a middle part in the radial direction of the rotor 1. Moreover, the insertion groove 29 is formed in the first overlapping portion 25 within a range of from the outer side to the middle part in the radial direction of the rotor 1. That is, the insertion groove 29 does not pass through the first-end baffle piece 21 in the radial direction of the rotor 1.

The insertion portion 27b is fixed to the insertion groove 29 with a fitting tolerance corresponding to that of transition-fit or interference-fit. Shapes of the insertion portion 27b and the insertion groove 29 of other resin plates 27 are also similar to those described above. Moreover, other configurations are similar or identical to those of the second embodiment.

As described above, even in combination with the insertion portion 27b and the insertion groove 29 each having a smaller dimension in the radial direction of the rotor 1, an effect similar to that of the fourth embodiment can be attained.

Note that, the insertion portion 27b in the fifth embodiment may be bonded to the first overlapping portion 25 or the second overlapping portion 26 with the adhesive 28 in a manner similar or identical to that illustrated in FIG. 13.

Sixth Embodiment

Figure 17:
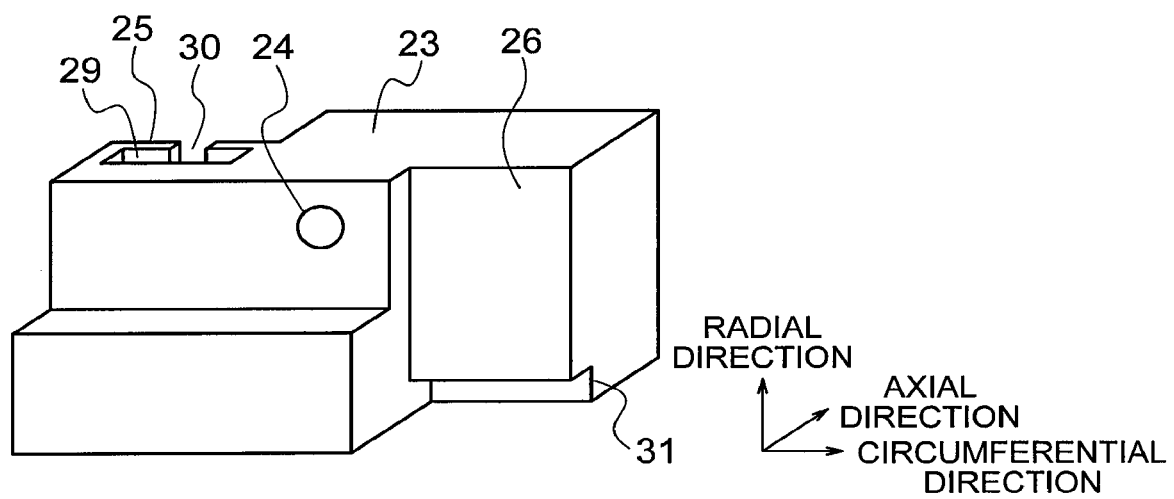
FIG. 17 is a perspective view for illustrating an intermediate baffle piece of a baffle plate in a sixth embodiment of this invention.
Figure 18:
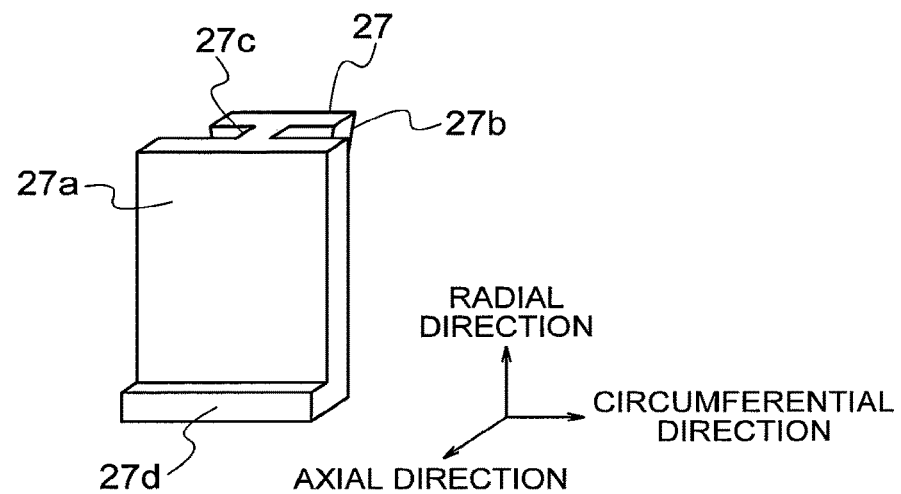
FIG. 18 is a perspective view for illustrating a resin plate to be combined with the intermediate baffle piece of FIG. 17.

Next, FIG. 17 is a perspective view for illustrating an intermediate baffle piece 23 of a baffle plate 14 in a sixth embodiment of this invention as viewed from a side opposite to that of FIG. 10. FIG. 18 is a perspective view for illustrating a resin plate 27 to be combined with the intermediate baffle piece 23 of FIG. 17.

In the sixth embodiment, a claw portion 27d which projects in the axial direction of the rotor 1 is provided at an end portion of the resin plate main body 27a on the radially inner side of the rotor 1. The claw portion 27d projects toward a side opposite to that of the insertion portion 27b.

The second overlapping portion 26 includes a step portion 31 configured to catch the claw portion 27d in the radial direction of the rotor 1. The step portion 31 is formed in the entirety of the end portion of the second overlapping portion 26 on the radially inner side of the rotor 1.

Each of other resin plates 27 also includes the claw portion 27d. Moreover, each of other intermediate baffle piece 23 and second-end baffle piece 22 also includes the step portion 31. The claw portion 27d is caught by the step portion 31 of other baffle piece 22 or 23. Other configurations are similar or identical to those of the first embodiment.

In such power generator, a repulsive force is generated in the resin plate 27 at the claw portion 27d against the centrifugal force to be generated in the resin plate 27 during operation. Therefore, the relative displacement in the radial direction of the rotor 1 is less liable to occur between the resin plates 27 and the baffle pieces 21, 22, and 23.

Note that, the claw portion 27*d* and the step portion 31 as described in the sixth embodiment may be applied to the fifth embodiment.

Moreover, the insertion portion 27*b* in the sixth embodiment may be bonded to the first overlapping portion 25 or the second overlapping portion 26 with the adhesive 28.

Further, the insertion groove 29 may be formed in each of the second overlapping portions 26 of the second-end baffle piece 22 and the intermediate baffle piece 23, and the step portion 31 may be formed in each of the first overlapping portions 25 of the first-end baffle piece 21 and the intermediate baffle piece 23.

Seventh Embodiment

Figure 19:
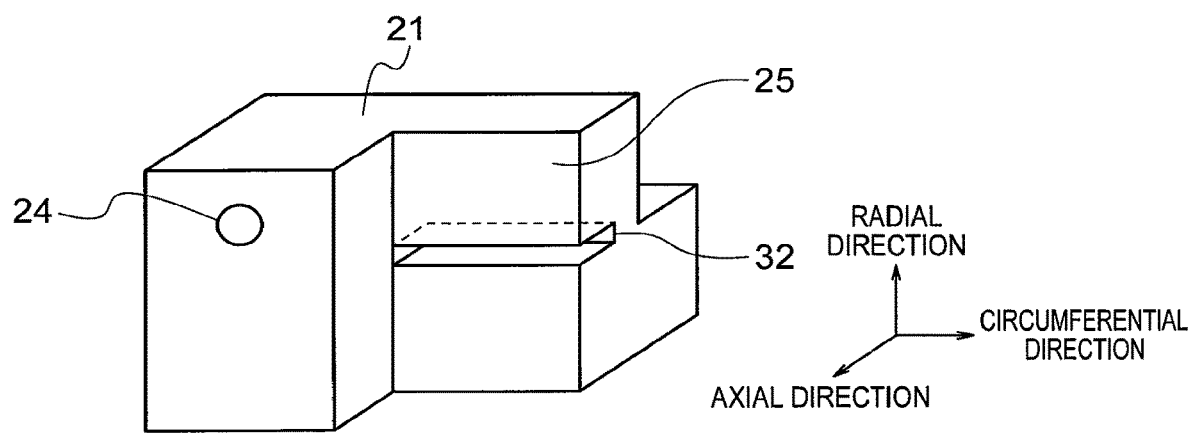
FIG. 19 is a perspective view for illustrating a first-end baffle piece of a baffle plate in a seventh embodiment of this invention.
Figure 20:
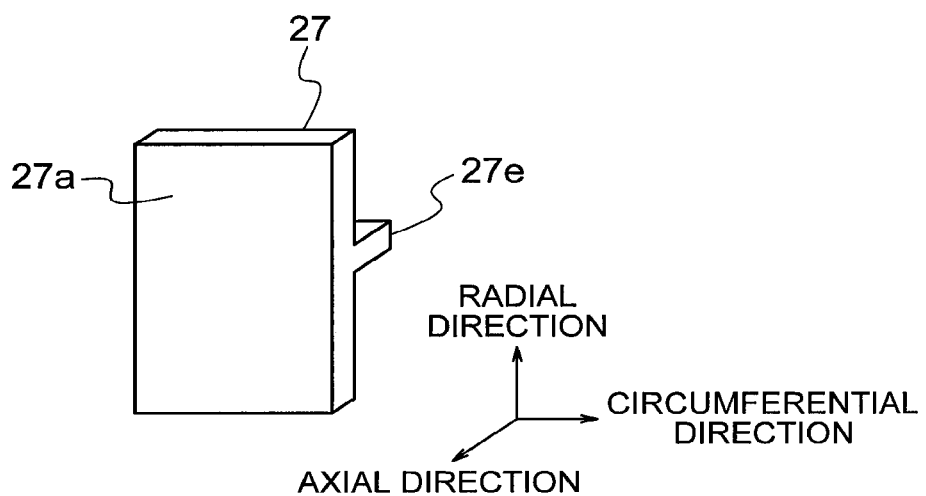
FIG. 20 is a perspective view for illustrating a resin plate to be combined with the first-end baffle piece of FIG. 19.

Next, FIG. 19 is a perspective view for illustrating a first-end baffle piece 21 of a baffle plate 14 in a seventh embodiment of this invention, and FIG. 20 is a perspective view for illustrating the resin plate 27 to be combined with the first-end baffle piece 21 of FIG. 19.

The resin plate 27 includes a protrusion portion 27*e* which projects in the axial direction of the rotor 1. The first overlapping portion 25 of the first-end baffle piece 21 includes a recess portion 32 configured to receive the protrusion portion 27*e* fitted thereto. The protrusion portion 27*e* is fixed to the recess portion 32 with a fitting tolerance corresponding to that of transition-fit.

Each of other resin plates 27 also includes the protrusion portion 27*e*. Moreover, the first overlapping portion 25 of the intermediate baffle piece 23 includes the recess portion 32. Other configurations are similar or identical to those of the first embodiment.

In such power generator, with the protrusion portion 27*e* being fitted to the recess portion 32 so that the resin plate 27 is fixed in advance to the first-end baffle piece 21 and the intermediate baffle piece 23, when the baffle plate 14 is to be mounted to the end ring 13, it is only required that the baffle pieces 21, 22, and 23 be simply fixed to the end ring 13 with the bolts 15.

Thus, work time required for mounting the baffle plate 14 to the end ring 13 can be shortened. Moreover, the repulsive force 32 from the recess portion 32 acts on the resin plate 27 against the centrifugal force to be generated by the own weight of the resin plate 27 during operation of the power generator. Thus, the relative displacement in the radial direction of the rotor 1 is less liable to occur between the resin plates 27 and the baffle pieces 21 and 22.

Note that, the resin plate 27 in the seventh embodiment may be bonded to the first overlapping portion 25 with the adhesive 28.

Moreover, the protrusion portion 27*e* may project toward a side opposite to that of FIG. 20, and the recess portion 32 may be formed in each of the second overlapping portions 26 of the second-end baffle piece 22 and the intermediate baffle piece 23.

Further, two or more protrusion portions 27*e* may be formed on one resin plate 27, and the same number of recess portions 32 as the protrusion portions 27*e* may be formed on corresponding one of the first overlapping portion 25 or the second overlapping portion 26.

Figure 21:
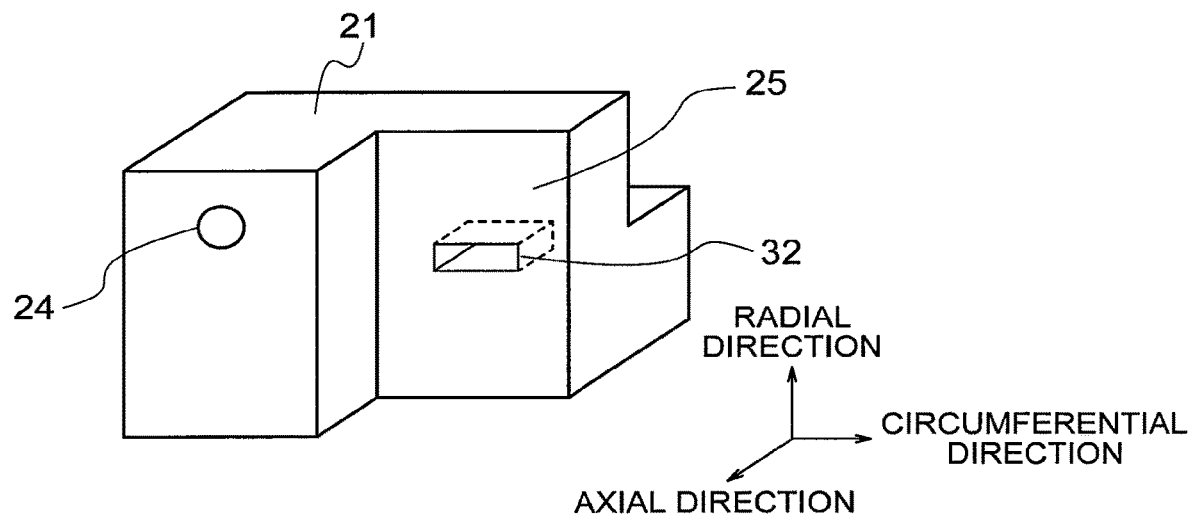
FIG. 21 is a perspective view for illustrating a modification example of a recess portion of FIG. 19.
Figure 22:
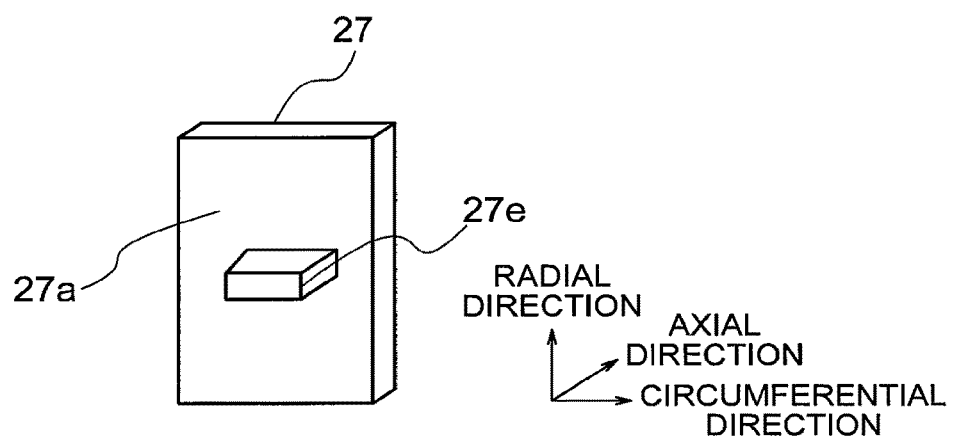
FIG. 22 is a perspective view for illustrating a modification example of a protrusion portion of FIG. 20.

Furthermore, a length of the protrusion portion 27*e* with respect to the resin plate main body 27*a* and a shape of the protrusion portion 27*e* are not limited to those given in the example described above. For example, shapes of the recess portion 32 of the baffle piece 21 illustrated in FIG. 21 and the protrusion portion 27*e* of the resin plate main body 27*a* illustrated in FIG. 22 may also be applicable. In FIG. 22, the protrusion portion 27*e* is formed only at an intermediate portion of the resin plate main body 27*a* in the width direction. Moreover, the protrusion portion 27*e* is reduced in width toward a distal end thereof.

Figure 23:
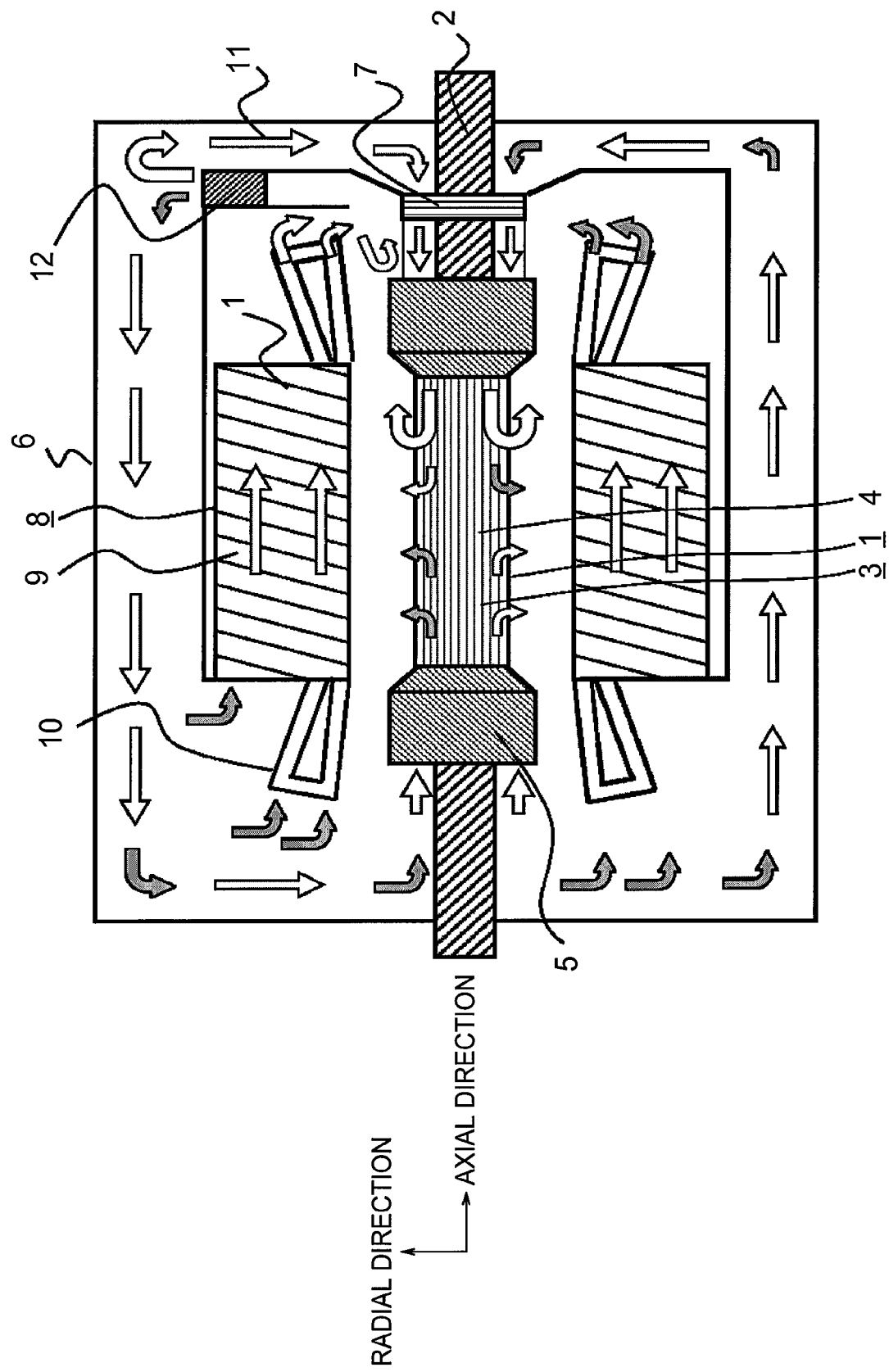
FIG. 23 is a sectional view for illustrating another example of a power generator to which this invention is applied.

Moreover, in FIG. 1, illustration is given of the power generator employing the rotor radial ventilation system. However, this invention is applicable also to a power generator of another type. For example, this invention is applicable also to a power generator employing a rotor/stator inner cooling system as illustrated in FIG. 23. In the power generator illustrated in FIG. 23, only one air-sending fan 7 is provided to the rotor shaft 2. The cooling gas 11 is sent out by the air-sending fan 7 and passes through the inside of the rotor 1, a periphery of the rotor 1, the inside of the stator 8, and a periphery of the stator 8, thereby becoming higher in temperature. After that, the cooling gas 11 passes through the gas cooling device 12, thereby becoming lower in temperature.

Further, the fastener configured to fix the baffle plate is not limited to the bolt. The fastener may be, for example, a rivet or a pin, which is capable of attaining the fastening effect through insertion into a hole formed in an object to be fastened.

Furthermore, in the example described above, each baffle segment is fixed with one bolt. However, each may be fixed with two or more fasteners. For example, two bolts may be arrayed in the vicinity of the rotor in the radial direction.

Moreover, a material of the interposition plate is not particularly limited to the resin, and may be, for example, metal or ceramic.

Further, it is not always required that the interposition plate be interposed. For example, without use of the interposition plate, resin in a form of a coating material may be applied to the overlapping portion and cured thereat.

Furthermore, the number of the baffle segments may be any number equal to or larger than two. For example, one intermediate baffle piece 23 or three or more intermediate baffle pieces 23 may be provided, or only the first-end baffle piece 21 and the second-end baffle piece 22, without the intermediate baffle piece 23, may be provided.

In the example as described above, the power generator is given as a rotary electric machine. However, this invention is applicable also to an electric motor.

REFERENCE SIGNS LIST 1 rotor, 2 rotor shaft, 3 rotor main body, 7 air-sending fan, 11 cooling gas, 14 baffle plate, 15 bolt, 21 first-end baffle piece (baffle segment), 22 second-end baffle piece (baffle segment), 23 intermediate baffle piece (baffle segment), 25 first overlapping portion, 26 second overlapping portion, 27 resin plate (interposition plate), 27*a* resin plate main body (interposition plate body), 27*b* insertion portion, 27*d* claw portion, 27*e* protrusion portion, 28 adhesive, 29 insertion groove, 31 step portion, 32 recess portion

The invention claimed is:

1. A rotary electric machine, comprising:
   a rotor including a rotor shaft and a rotor main body provided to the rotor shaft; and
   a baffle plate, which is fixed at a plurality of positions to an end portion of the rotor main body in the axial direction, and is configured to define an airflow passage for cooling gas,
   wherein the baffle plate is segmented into a plurality of baffle segments which are arrayed in a circumferential direction of the rotor, wherein the baffle segments each include an overlapping portion which overlaps an adjacent baffle segment in an axial direction of the rotor, and wherein an interposition plate is interposed between the overlapping portions overlapping each other.

2. The rotary electric machine according to claim 1, wherein the interposition plate is made of resin.

3. The rotary electric machine according to claim 1, wherein the interposition plate is bonded to the overlapping portion with an adhesive.

4. The rotary electric machine according to claim 1, wherein the interposition plate includes:

an interposition plate main body; and an insertion portion, which has a wedge shape, and is provided to the interposition plate main body, wherein the baffle segments each have an insertion groove configured to receive the insertion portion inserted thereinto, and wherein the interposition plate is mounted to the baffle segment through insertion of the insertion portion into the insertion groove along a radial direction of the rotor.

5. The rotary electric machine according to claim 4, wherein the insertion portion is provided to the interposition plate main body within a range of from an outer side to a middle part in the radial direction of the rotor, and wherein the insertion groove is formed in the baffle segment within a range of from the outer side to the middle part in the radial direction of the rotor.

6. The rotary electric machine according to claim 1, further comprising a claw portion, which is provided at an end portion of the interposition plate on a radially inner side of the rotor, and projects in the axial direction of the rotor, wherein the adjacent baffle segment includes a step portion configured to catch the claw portion in the radial direction of the rotor.

7. The rotary electric machine according to claim 1, wherein the interposition plate includes a protrusion portion which projects in the axial direction of the rotor, and wherein the baffle segment includes a recess portion configured to receive the protrusion portion fitted thereto.

* * * * *